United States Patent [19]
Davis et al.

[11] Patent Number: 5,627,751
[45] Date of Patent: May 6, 1997

[54] LAND VEHICLE SUSPENSION SYSTEM HAVING A FAILURE DETECTOR FOR DETECTING FAILURE OF A SENSOR OF THE SYSTEM

[75] Inventors: John P. Davis, Norfolk; Jeremy H. A. Bliss, Essex, both of United Kingdom

[73] Assignee: Lotus Cars Limited, United Kingdom

[21] Appl. No.: 356,188

[22] PCT Filed: Jun. 22, 1993

[86] PCT No.: PCT/GB93/01312

§ 371 Date: May 10, 1995

§ 102(e) Date: May 10, 1995

[87] PCT Pub. No.: WO94/00308

PCT Pub. Date: Jan. 6, 1994

[30] Foreign Application Priority Data

Jun. 22, 1992 [GB] United Kingdom ............... 9213178

[51] Int. Cl.⁶ .................................................. B60G 17/015
[52] U.S. Cl. ........................... 364/424.034; 364/424.046; 280/707
[58] Field of Search ..................... 364/424.03, 424.05; 280/707; 340/438

[56] References Cited

U.S. PATENT DOCUMENTS

| | | | |
|---|---|---|---|
| 4,718,695 | 1/1988 | Kawagoe | 280/707 |
| 4,743,000 | 5/1988 | Karnopp | 267/218 |
| 4,939,654 | 7/1990 | Kouda et al. | 364/424.05 |
| 5,042,833 | 8/1991 | Kawabata | 280/707 |
| 5,170,343 | 12/1992 | Matsuda | 364/184 |

FOREIGN PATENT DOCUMENTS

| | | |
|---|---|---|
| 377211 | 7/1990 | European Pat. Off. |
| 455993 | 11/1991 | European Pat. Off. |
| 3930302 | 5/1990 | Germany |
| 61036010 | 2/1986 | Japan |
| 61261113 | 11/1986 | Japan |
| 61282110 | 12/1986 | Japan |
| 63-188510 | 8/1988 | Japan |
| 63-188511 | 8/1988 | Japan |
| 2144209 | 6/1990 | Japan |
| 2278157 | 11/1990 | Japan |
| 3070619 | 3/1991 | Japan |
| 3090421 | 4/1991 | Japan |
| 3090864 | 4/1991 | Japan |

*Primary Examiner*—Michael Zanelli
*Attorney, Agent, or Firm*—Westman, Champlin & Kelly, P.A.

[57] ABSTRACT

The present invention relates to a land vehicle suspension in which a plurality of wheel and hub assemblies (10,11,12,13) are each connected to the body of the vehicle by one of a plurality of actuators (26,27,28,29). The operation of each actuator (26,27,28,29) is controlled by an electronic or electrical processor (100). The processor (100) operates in response to signals received from a plurality of sensors which generate output signals indicative of the attitude of the vehicle body and forces on the body; e.g. a yaw gyrometer (200), a lateral accelerometer (300), a longitudinal accelerometer (400), a steering angle sensor (500), a vehicle speed sensor (600), load cells (45,46,47,48), hub accelerometers (49,50,51,52) and L.V.I.T.'s (53,54,55,56). The processor (100) detects failure of a sensor and a detection of the failure of the sensor operates in response to the remaining functioning sensor or functioning sensors of the plurality of sensors. Preferably the processor replaces the output signal of the failed sensor with a signal derived from an output signal of a functioning sensor or output signals of functioning sensors.

15 Claims, 1 Drawing Sheet

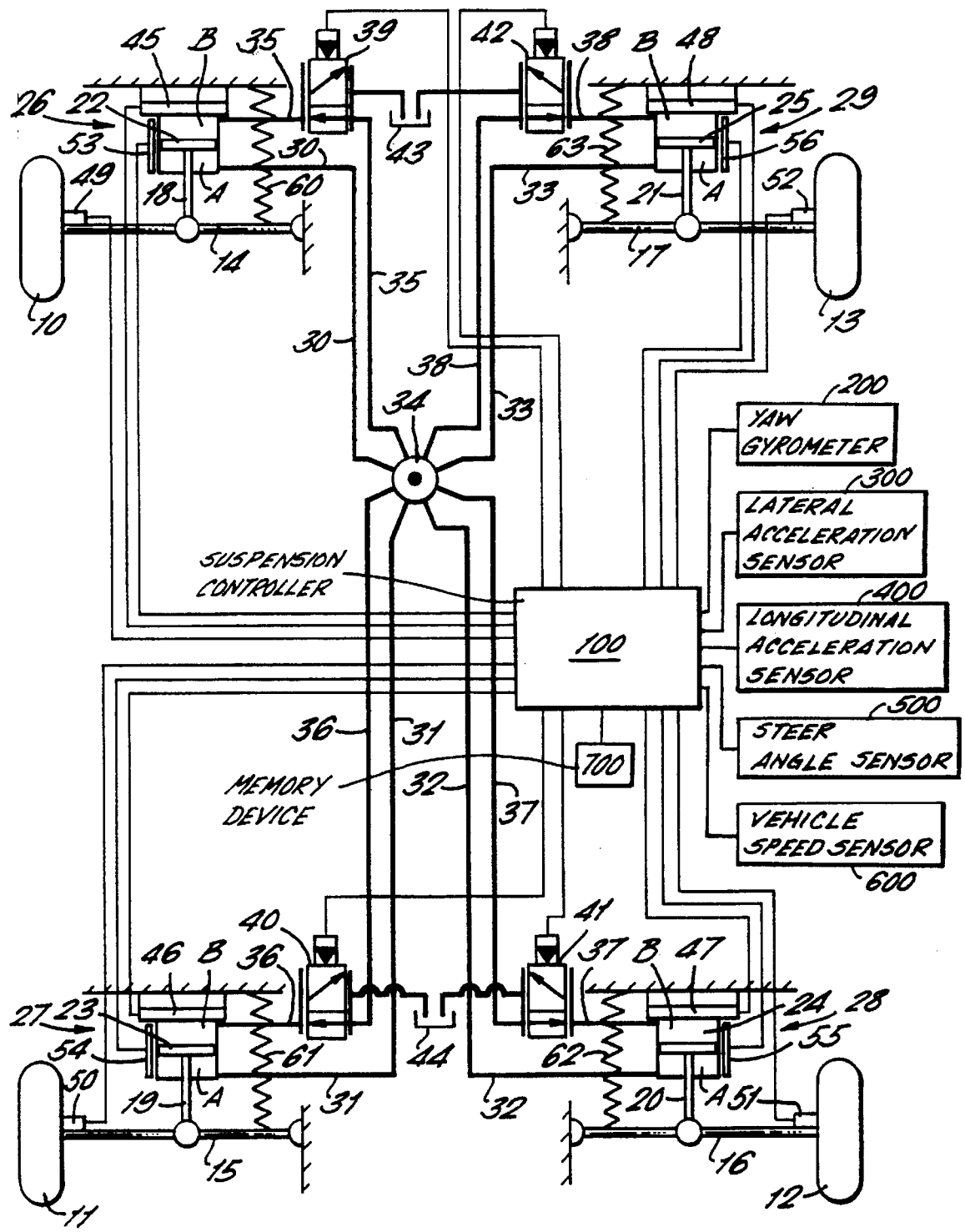

LAND VEHICLE SUSPENSION SYSTEM HAVING A FAILURE DETECTOR FOR DETECTING FAILURE OF A SENSOR OF THE SYSTEM

BACKGROUND OF THE INVENTION

The present invention relates to vehicle suspension systems and more particularly to vehicle suspension system in which a plurality of wheel and hub assemblies are each connected to the body of a vehicle by one of a plurality of actuators and the operation of each actuator is controlled by an electronic or electrical processor.

Suspension systems according to the invention have been described as "active" suspension systems. Such suspension systems are well known and have been described in patent applications such as European patent publication Nos. 0114757 and 0190944.

It is a problem with an active suspension system to control the suspension system upon failure of one of the sensors. Obviously, it is very undesirable for the suspension system to fail completely on failure of a sensor. This can be highly dangerous in a situation where the vehicle is manoeuvering at high speed and can lead to accidents.

In fly-by-wire systems in aircraft generally several identical control systems are run in parallel and the output of each control system is checked against the output of the others. If one control system has a different output from the others then it is assumed to be faulty and therefore shut down. The costs of such an approach and the limited space in a motor vehicle make the approach impractical for controlling a land vehicle suspension system.

SUMMARY OF THE INVENTION

The present invention provides a land vehicle suspension system in which a plurality of wheel and hub assemblies are each connected to the body of the vehicle by one of a plurality of actuators and the operation of each actuator is controlled by an electronic or electrical processor in response to signals received from a plurality of sensors which generate output signals indicative of the attitude of the vehicle body and the forces on the body, wherein the processor has failure detection means for detecting failure of a sensor and on detection of the failure of the sensor replaces the output signal of the failed sensor with a replacement signal and operates in response to the replacement signal and the output signal or output signals generated by a functioning sensor or functioning sensors of the plurality of sensors.

Preferably the processor on detection of failure of a sensor replaces the output signal generated by the failed sensor with a replacement signal derived from an output signal or output signals generated by a functioning sensor or sensors of the plurality of sensors.

In this specification the word derives should be construed such that it includes calculation of a replacement signal as a function of one other signal, calculation of a replacement signal as a function of a plurality of other signals, simple replacement of a failed sensor's signal with the signal generated by another sensor, filtering of a signal to produce a replacement signal and differentiating or integrating a signal to produce a replacement signal.

Preferably the processor generates control signals to control the actuators in response to signals received from a plurality of sensors comprising two or more of a sensor for measuring lateral acceleration of the vehicle, a sensor for measuring the longitudinal acceleration of the vehicle, a sensor for measuring the speed of the vehicle, sensors for measuring the loads transmitted from the actuators to the vehicle body, sensors for measuring the extension and contraction of the actuators, and a sensor for measuring the yaw rate of the vehicle, and when the failure detections means detects failure of one or more of the sensors for measuring; the lateral acceleration of the vehicle; the longitudinal acceleration of the vehicle; loads transmitted to the vehicle body; or the extensional and contraction of the actuators; the processor replaces the output signal of the failed sensor or sensors with a replacement signal or replacement signals derived from an output signal or output signals generated by a functioning sensor or functioning sensors of the plurality of sensors.

It will be seen that the present invention therefore provides an active suspension system which does not fail completely upon failure of one of the sensors of the system.

BRIEF DESCRIPTION OF THE DRAWING

The accompanying drawing schematically shows a vehicle suspension system according to the invention.

DESCRIPTION OF THE PREFERRED EMBODIMENT

In the drawing there can be seen four wheel and hub assemblies 10, 11, 12 and 13. The wheel and hub assemblies 10, 11, 12 and 13 are respectively mounted to the vehicle body by suspension arms 14, 15, 16 and 17 which are pivotally attached to the vehicle body. The suspension arms 14, 15, 16 and 17 are also pivotally connected respectively to linkages 18, 19, 20 and 21. The linkages are connected to the pistons 22, 23, 24 and 25 within actuators 26, 27, 28 and 29. Road springs 60, 61, 62 and 63 act in parallel with the actuators to support the vehicle body.

Each of the actuators 26, 27, 28 and 29 has a lower chamber A and an upper chamber B. The lower chambers A of the actuators 26, 27, 28 and 29 are permanently connected to a source of pressurised fluid 34 by hydraulic lines 30, 31, 32 and 33.

The upper chambers B of the actuators 22, 23, 24 and 25 are connected by hydraulic lines 35, 36, 37 and 38 to servo-valves 39, 40, 41 and 42. The servo-valves can each connect an upper chamber B to either the source of pressurised fluid 34 or to one of the two exhausts for pressurised fluid 43 and 44. In practice the exhausts for pressurised fluid 43 and 44 will be return lines to a pump constituting the source of pressurised fluid 34.

The surfaces of the pistons 22, 23, 24 and 25 acting within the upper chambers B are of greater area than the surfaces of the pistons acting within the lower chambers A. Therefore, if a servo-valve such as that servo-valve 39 connects its respective chamber B to the source of pressurised fluid then a net downward resultant force is exerted upon a piston in the actuator, which then is transmitted to the relevant wheel and hub assembly. On the other hand, if a servo-valve such as 39 connects the respective upper chamber B to an exhaust for pressurised fluid then a net resultant upward force is exerted on the piston of the relevant actuator which is then transmitted to the wheel and hub assembly. The servo-valves 39, 40, 41 and 42 meter the flow of hydraulic fluid into and/or out of the upper chambers B to control the velocity of the pistons within the actuator and thereby the velocity of the wheel and hub assemblies.

A suspension controller 100, an electronic digital processor, controls all of the servo-valves 39, 40, 41 and 42 to control the velocity of the wheel and hub assemblies 10, 11, 12 and 13 and thereby to control the suspension of the vehicle. In order to properly control the suspension of the vehicle, the suspension control processor 100 receives various input signals from sensors located around the vehicle. How the suspension control processor 100 generates control signals from the sensed signals it receives is not the subject of this patent and has been discussed in many previous published patents. Therefore it will not be described. The suspension controller 100 has a memory device 700 associated therewith, which will be described later.

In the suspension system of the preferred embodiment of the invention a yaw gyrometer 200 measures the yaw rate of the vehicle and generates a signal indicative thereof, which is sent to the control processor 100. The yaw rate of a vehicle is the rate of revolution of the vehicle about an axis through the vehicle perpendicular to principal plane of the vehicle, i.e., if the vehicle is on horizontal ground then the yaw rate of the vehicle would be the rate of rotation of the vehicle about a vertical axis passing through the vehicle.

The processor 100 also receives a signal indicative of the lateral acceleration of the vehicle, that is to say the acceleration of the vehicle perpendicular to the normal direction of the vehicle, a lateral acceleration signal being generated by the sensor 300.

The processor 100 further receives a signal indicative of the longitudinal acceleration of the vehicle which is generated by the sensor 400.

A sensor 500 measures the steer angle of the vehicle, that is to say the angle of the front wheels from a fixed reference place. The sensor 500 generates a signal indicative of the steer angle and transmits the generated signal to the processor 100.

A sensor 600 measures the speed of the vehicle and generates a singal indicative thereof which it sends to the control processor 100.

Four load cells 45, 46, 47 and 48 measure the load transmitted from the actuators 26, 27, 28 and 29 to the vehicle body. Each load cell generates a signal which it sends to the central control processor 100.

On the wheel and hub assemblies 10, 11, 12 and 13 there are situated hub accelerometers 49, 50, 51 and 52. The hub accelerometers measure the upward and downward acceleration of their respective wheel and hub assemblies. Each hub accelerometer generates a signal which is transmitted to the central control processor 100.

Four linear variable induction transducers (L.V.I.T.s) 53, 54, 55, and 56 are provided to measure the position of the pistons 22, 23, 24 and 25 within the respective actuators. The L.V.I.T.s then each provide a displacement position signal to the suspension control unit 100.

Sensor Failure

In normal operation, all of the sensors operate as described above. However, failure of one or more of the sensors must be anticipated. The applicant has devised ways in which the signal provided by a failed sensor can be substituted by a replacement signal. We shall now deal with each type of sensor in turn.

1. L.V.I.T. Failure

If one of the L.V.I.T.s 53, 54, 55 or 56 fails then the signal generated by the failed L.V.I.T. is replaced by a replacement signal calculated from the signals generated by one or more of the other L.V.I.T.s, which are appropriately scaled to take account of differing suspension geometry.

The substitution used for an L.V.I.T. depends the lateral acceleration sensed by the vehicle.

As an example, if the L.V.I.T. 53 fails and X1 is the signal that it usually generates then the central processor 100 calculates a replacement signal X1' as follows;

If $MSny < C_1$ then $X1' = X2$

If $MSny > C_1$ then $X1' = X3 * IVrf * Vrr$

Where $C_1$=chosen predetermined level of lateral acceleration stored in the memory device 700

X1'=displacement signal X1 generated by L.V.I.T. 53

X2=displacement signal generated by L.V.I.T. 56

X3=displacement signal generated by L.V.I.T. 54

X4=displacement signal generated by L.V.I.T. 55

IVrf=inverse front velocity ratio (constant calculated or measured for a particular vehicle), stored in the memory device 700

Vrr=rear velocity ratio (constant calculated or measured for a particular vehicle), stored in the memory device 700.

The constant Vrr is used to convert the measured actuator displacement $X_3$ to a displacement at the tire contact patch of the wheel and hub assembly 11. The constant will depend on suspension geometry and gives the ratio between actuator displacement and contact patch displacement. The term is called a velocity ration since it gives the relationship between the velocity of an actuator (i.e. rate of change of length of actuator) and the velocity of the associated wheel and hub assembly at the contact patch; but, of course, the ratio is the same for displacements.

The constant IVrf is used to convert the displacement of the contact patch of the wheel and hub assembly 10 to the displacement of the actuator 26 (I represents an inverse, i.e. IVrf=1/Vrf).

Similar substitutions will be made if other L.V.I.T.'s fail. In each case the measured lateral acceleration MSn is less than C1 then the output signal of the failed sensor will be replaced by the output of the other L.V.I.T. sensor located on the same axle. If the measured lateral acceleration is greater than C1 then the output signal of a failed sensor will be replaced by the signal calculated as a function of the output signal of the L.V.I.T. sensor on the same side of the vehicle.

An alternative L.V.I.T. substitution can be made for the failure of the L.V.I.T. 53 as follows.

In the alternative method if the L.V.I.T. 53 fails and X1 is the signal that it usually generates then the central processor 100 calculates a replacement signal X1 as follows:

$X1'' = ([(X3-X4) * Vrr/K_1] * IVrf) + X2$

Where
Where $K_1$=scaling factor to enable best use of processor capacity, stored in the memory device 700

X1''=replacement signal to replace displacement signal X1 generated by L.V.I.T. 53

X2=displacement signal generated by L.V.I.T. 56

X3=displacement signal generated by L.V.I.T. 54

X4=displacement signal generated by L.V.I.T. 55

Vrr=rear velocity ratio (constant calculated or measured for a particular vehicle), stored in the memory device 700

IVrf=front inverse velocity ratio (constant calculated or measured for a particular vehicle), stored in the memory device 700.

Using this substitution the signal generated by a failed L.V.I.T. is replaced by a signal calculated as the sum of the signal generated by the L.V.I.T. on the same axle and the product of a constant and the difference between the signals generated by the L.V.I.T.'s on the other axle.

2. Load Cell Failure

When the vehicle is not cornering (i.e., measured lateral acceleration is low) signals generated by the lead cell on the same axle as a failed lead cell are used to replace the signal of the failed lead cell with a correction included for the measured lead induced by to suspension position. For instance if the lead cell 45 fails then its output is replaced by a signal derived from the output of load cell 48 with a correction term to compensate for unmeasured loads such as the force transmitted between the wheel and hub assemblies and the vehicle body by the springs 60, 61, 62, 63 which act between them in parallel with the actuators (these unmeasured loads can be calculated from the measured positions).

During cornering the above-mentioned substitution is incorrect so the load cell on the same side of the vehicle as the failed load cell is used to provide the necessary signal. Once again loads due to suspension position are compensated for and a suitable scaling factor is also included.

If F1 if the signal generated by the front left load cell 45 then:

$$\text{If } MSny < C_2 \text{ THEN}$$
$$F1' = [(X1-X2)*KFtWs/K_2] + F2$$
$$\text{ELSE}$$
$$F1' = ([(X1*KFtWs) - (X3*KRtWs)/K_2]) + (F3*[(IVrf*Vrr/K_1)])$$

Where

F1'=replacement signal $C_2$=chosen predetermined level of lateral acceleration, stored in the memory device 700

MSny=lateral acceleration $K_1, K_2$=scaling constants chosen to make best use of processor capacity, stored in the memory device 700

F2,F3=load transducer outputs of load cells 45, 48 and 46 respectively

X1,X2,X3=displacement transducer outputs of L.V.I.T.s 53, 56 and 54 respectively KFtWs=front axle parallel spring term (constant calculated or measured for a particular vehicle), stored in the memory device 700

KRtWs=rear axle parallel spring term (constant calculated or measured for a particular vehicle), stored in the memory device 700

IVrf=inverse front velocity ratio (constant calculated or measured for a particular vehicle)

If the suspension control processor 100 calculates warp load on the vehicle when generating the control signals to control the actuators then the calculation of and adjustment for warp load is "switched off" since algorithms for calculating warp load cannot operate with only three load cells functioning.

3. Hub Accelerometer Failure

The hub accelerometer failure case is a minor failure since the inertial mass of the wheel and hub assembly 13 is much smaller than the inertial mass of the vehicle body, thus the signal of the failed hub accelerometer is replaced by a zero value replacement signal.

For instance if DDXu1 is the signal produced by the front left hub accelerometer then IF failure detected THEN DDXu1'=0

Where

DDXu1'=replacement signal for hub acceleration transducer output signal DDXu1.

4. Lateral Accelerometer Failure

The lateral acceleration substitution uses an estimate of lateral acceleration based on velocity and yaw rate. In order to achieve the correct ratio between lateral acceleration (ny) and speed (v) and yaw rate (r) a low pass digital filter is used while ny is calculated. This has the effect of averaging the calculated lateral acceleration over a clocked period of the processor 100. Generally the suspension control processor 100 will be adjusted to induce understeer in the vehicle, thereby reducing lateral acceleration on the vehicle as compared with the performance of the suspension system pre-failure, for safety reasons.

If the lateral accelerometer fails then the control processor 100 calculates a replacement signal for the lateral acceleration signal (ny) as follows:

$$ny' = (Latfm*V*K_3 r)/K_5$$

where Latfm is the most significant part of a scaling factor (Latfm+Latfl) which is calculated iteratively as follows:

$$TEMP = ([ABS[(Ny*K_4/r)*K_5/V] - Latfm]*Kgr) \ (Latfm*K_5 + Latfl)new = (Latfm*K_5 + Latfl)old + TEMP$$

Where

TEMP=variable assigned a calculated value during iteration

Latfm=the most significant part of the scaling factor

Latfl=the least part of the scaling factor ny'=replacement signal for lateral accleration r=yaw rate V=speed Kgr=filter time constant, stored in the memory device 700

ABS denotes absolute value $K_2$=is a scaling factor to enable best use of processor capacity, stored in the memory device 700

$K_3, K_4, K_5$=scaling constants to enable best use of processor, stored in the memory device 700

5. Longitudinal Accelerometer Failure

The substituted signal for longitudinal acceleration is produced by a digital band pass filter on the differential of speed. This gives an estimate of acceleration up to 5 Hz.

If the longitudinal acclerometer fails then the central control processor calculates longitudinal acceleration Nx as the sum of two parts NxCm and NxCl as follows:

$$NxCm*Ks + NxCl = ((Kva3*NxCpp) + (Kva2*NxCm) + [Kva1*(Vpp - Vp)])Nx = NxCm$$

Where

Nx=longitudinal acceleration

NxCm=most significant part of acceleration estimate

NxCl=least significant part of acceleration estimate

Kva1,Kva2,Dva3=filter time constants, stored in the memory device 700

NxCpp=the second previous value of NxCm

Vpp=the second previous value of speed

Vp=the previous value of speed.

The signal Nx originally produced by the failed sensor being replaced by Nxcm.

In control systems which calculate the warp load on a vehicle, the calculation is halted on failure of the longitudinal accelerometer.

6. Yaw Rate Gyrometer and Vehicle Speed Sensor Failures

Yaw rate and vehicle speed failure are generally considered minor failures since the generated signals are not usually crucial to the operation of the suspension control processor 100. In such cases the yaw rate signal is replaced by a zero value replacement signal and the vehicle speed signal is replaced by a constant value replacement signal of a prechosen value to allow operation of other algorithms of the central control processor.

7. Steer Angle Sensor Failure

Steer angle, like yaw rate and speed, is in most active suspension systems a minor failure thus the steer angle signal is replaced by a zero value replacement signal.

Detection of Failure

The central control processor 100 actually detects whether a sensor has failed using one or more of the following checks;

a) Range Check

The central processor 100 checks that the output signal of each sensor does not exceed a predetermined operating range stored in the memory device 700.

b) Offset Check

The central control processor checks that the output signal of each sensor has not moved away from its zero or offset position. For all devices other than loads and displacement this value will be zero. For loads and displacements terms will be included to remove dynamic influences and offsets due to bias terms and presets.

c) Checking against other transducer inputs

The central control processor checks that output signal of each sensor is consistent with the output signal from another sensor or with output signal from several other sensors. For example a large hub acceleration should cause a large load input. Thus each sensor should be able to give an estimate of another performance. The substitutions described above which occur on failure of a sensor can be used to provide signals against which a generated signal of a sensor can be checked.

d) Noise Check

The central control processor can simply check that the noise portion of a signal generated by a given sensor does not exceed the noise portions of the signals of other similar sensors by more than a predetermined range stored in the memory device 700.

e) Iterative Checking

The central control processor can check each generated signal from a sensor against the last. If the difference in signals exceeds the amount that changes to the physical inputs to the sensor could invoke which amount is stored as a preprogrammed value in the memory device 700, then this value is noted. If the number of such occurrences in a give time exceeds 20% then the processor recognizes that the sensor concerned has failed because the frequency with which the difference exceeds the preprogrammed value has exceeded the predetermined frequency stored in the memory device 700.

As can be seen from the above the present invention provides an active suspension system which can continue to operate after failure of one of the sensors of the system. Therefore the system can still operate so that the driver maintains some control over the vehicle. For minor sensor failures the control of the vehicle is not seriously impaired.

In the preferred embodiment of the invention a warning light is provided on the dashboard of the relevant vehicle, so that the driver of the vehicle is warned if the central control processor detects a failure of a sensor.

In the description above reference is made to several scaling constants, $K_1$, $K_2$, $K_3$ etc. These are included in the algorithms since in the preferred embodiment of the invention the suspension control processor has a 32 bit accumulator and the values of the generated signals are therefore scaled to achieve maximum resolution. Preferably the generated signals are scaled to have fractional values.

Whilst in the embodiment described above "unequal area" hydraulic actuators are used it should be appreciated that the vehicle suspension system of the invention can be used with any type of actuator, whether hydraulic pneumatic or otherwise.

Whilst the preferred embodiment of the invention described above makes reference to use of the vehicle suspension system of the invention in a land vehicle having four wheels, it should be appreciated that the suspension system could be used for any land vehicle including tracked vehicles.

We claim:

1. A land vehicle suspension system comprising two pairs of actuators, a first pair of actuators connecting wheel and hub assemblies on a first axle with a body of the vehicle and a second pair of actuators connecting wheel and hub assemblies on a second axle with the body of the vehicle the operation of each actuator being controlled by a processor in response to signals received from a plurality of sensors which generate output signals indicative of the attitude of the vehicle body and the forces of the body, the plurality of sensors comprising sensors for measuring extension and contraction of the actuators, wherein:

the processor has failure detection means for detecting failure of each of the sensors for measuring the extension and contraction of the actuators and on detection of said failure replaces the output signal of the failed sensor with a replacement signal and the processor operates in response to the replacement signal and at least one output signal generated by at least one remaining functioning sensor of the plurality of sensors; and upon detected failure of a sensor for measuring the extension or contraction of an actuator on the first axle the processor replaces the output signal of the failed sensor with a replacement signal derived by summing the output signal of the sensor measuring the extension and contraction of the other actuator on the first axle with a signal generated as a function of the difference between the output signals of the sensors measuring the extension and contraction of the actuators on the second axle.

2. A land vehicle suspension system as claimed in claim 1 wherein the failure detection means of the processor monitors the output signal of a sensor and compares the output signal with a range of output signals stored in memory and recognizes that the sensor has failed when the output signal is outside the predefined range.

3. A land vehicle suspension system as claimed in claim 1 wherein the failure detection means of the processor averages the output signal of a sensor over time and compares the averaged output signal with a range of output signals stored in memory and recognizes that the sensor has failed if the averaged output signal is outside the predefined range.

4. A land vehicle suspension system as claimed in claim 1 wherein the failure detection means of the processor monitors the output signal of a sensor and compares the output signal with an estimated output signal calculated from output signals generated by other sensors, the processor recognizing that the monitored sensor has failed if the difference between the measured and estimated output signals is outside a predefined value.

5. A land vehicle suspension system comprising two pairs of actuators, a first pair of actuators connecting wheel and hub assemblies on a first axle to a body of the vehicle and a second pair of actuators connecting wheel and hub assemblies on a second axle with the vehicle body, wherein:

the operation of each actuator is controlled by a processor in response to signals received from a plurality of sensors which generate output signals indicative of the attitude of the vehicle body and the forces on the body, the plurality of sensors comprising sensors for measuring extension and contraction of the actuators and a sensor for measuring lateral acceleration of the vehicle;

wherein the processor has failure detection means for detecting failure of each of the sensors for measuring the extension and contraction of the actuators and on detection of said failure replaces the output signal of the failed sensor with a replacement signal and operates in response to the replacement signal and at least one output signal generated by at least one remaining functioning sensor of the plurality of sensors; and wherein the processor comprises means for determining whether the output signal generated by the sensor for measuring lateral acceleration indicates that the lateral acceleration is below a chosen level and when the lateral acceleration is below the chosen level and there is detected a failure of a sensor measuring the extension and contraction of a first actuator of the first pair of actuators then the processor replaces the output signal generated by the failed sensor with the output signal generated by the sensor measuring the extension and contraction of the other actuator of the first pair of actuators.

6. A land vehicle suspension system as claimed in claim 5 wherein when the lateral acceleration is above the chosen level and there is a detected failure of a sensor measuring the extension and contraction of the first actuator of the first pair of actuators then the processor replaces the output signal generated by the first actuator by a replacement signal calculated as a function of the output signal generated by the sensor measuring the extension and contraction of the actuator of second pair of actuators which is located on the same side of the vehicle as the first actuator.

7. A land vehicle suspension system comprising two pairs of actuators, a first pair of first and second actuators connecting wheel and hub assemblies on a first axle with a body of the vehicle and a second pair of third and fourth actuators connecting wheel and hub assemblies on a second axle with the body of the vehicle, the operation of each actuator being controlled by a processor in response to signals received from a plurality of sensors which generate output signals indicative of the attitude of the vehicle body and the forces on the body, the plurality of sensors comprising a sensor for measuring lateral acceleration of the vehicle and sensors for measuring loads transmitted from the actuator to the vehicle body, and sensors for measuring extension and contraction of the actuators wherein:

the processor has failure detection means for detecting failure of each of the sensors for measuring loads transmitted from the actuators to the vehicle body and on detection of said failure replaces the output signal of the failed sensor with a replacement signal and operates in response to the replacement signal and at least one output signal generated by at least one remaining functioning sensor of the plurality of sensors; and upon a detected failure of a sensor for measuring the load transmitted by a first actuator to the vehicle body the processor determines whether the lateral acceleration of the vehicle is below a chosen level and when the lateral acceleration is below the chosen level the processor replaces the output signal of the failed sensor by a replacement signal calculated as a function of:

the output signal of the sensor for measuring the load transmitted to the vehicle body by a second actuator opposite the failed sensor on the same axle, and the difference between the output signals of the two sensors for measuring the extension and contraction of the first and second actuators.

8. A land vehicle suspension system as claimed in claim 7 wherein when after a detected failure of a sensor for measuring load transmitted by an actuator to the vehicle body the lateral acceleration is determined by the processor to be above the chosen level then the processor replaces the output signal of the failed sensor by a replacement signal calculated as a function of:

the output signal of a sensor for measuring the force transmitted to the vehicle body by a third actuator on the same side of the vehicle body as the failed sensor and on the second axle, and the difference between the output signals of the sensors for measuring the extension and contraction of the first and third actuators.

9. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body, the plurality of sensors comprising a sensor for measuring lateral acceleration of the vehicle, a sensor for measuring vehicle speed and a sensor for measuring vehicle yaw rate, wherein:

the processor has failure detection means for detecting failure of the sensor for measuring lateral acceleration of the vehicle and on detection of said failure replaces the output signal of the failed sensor with a replacement signal and operates in response to the replacement signal and at least one output signal generated by at least one remaining functioning sensor of the plurality of sensors; and upon a detected failure of the sensor for measuring the lateral acceleration of the vehicle the processor replaces the output signal of the failed sensor by a replacement signal calculated as a function of the output signal of the sensor for measuring vehicle speed and the output signal of the sensor for measuring vehicle yaw rate.

10. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body, the plurality of sensors comprising a sensor for measuring the longitudinal acceleration of the vehicle, and a sensor for measuring vehicle speed, wherein:

the processor has failure detection means for detecting failure of the sensor for measuring the longitudinal acceleration of the vehicle and on detection of said failure replaces the output signal of the failed sensor with a replacement signal and operates in response to the replacement signal and at least one output signal generated by at least one remaining functioning sensor of the plurality of sensors; and upon a detected failure of the sensor for measuring the longitudinal acceleration of the vehicle, the processor replaces the output signal of the failed sensor by a replacement signal derived by differentiating and filtering the output signal of the sensor for measuring vehicle speed.

11. A land vehicle suspension system in which a plurality of wheel and hub assemblies are each connected to a body of the vehicle by one of a plurality of actuators and the operation of each actuator is controlled by a electrical processor in response to signals received from a plurality of sensors which generate output signals indicative of the attitude of the vehicle body and the forces on the body, the plurality of sensors comprising a sensor for measuring yaw rate of the vehicle, wherein:

the processor has failure detection means for detecting failure of the sensor measuring yaw rate of the vehicle and on detection of said failure replaces the output signal of the failed sensor with a replacement signal and operates in response to the replacement signal and at least one output signal generated by at least one remaining functioning sensor of the plurality of sensors; and when the failure detection means detects failure of the sensor for measuring the yaw rate of the vehicle, the processor replaces the output signal of the failed sensor with a zero value replacement signal.

12. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body, the plurality of sensors comprising a sensor for measuring vehicle speed, wherein:

the processor has failure detecting means for detecting failure of the sensor for measuring vehicle speed and on detection of said failure replaces the output signal of the failed sensor with a replacement signal and operates in response to the replacement signal and at least one output signal generated by at least one remaining functioning sensor of the plurality of sensors; and when the failure detection means detects failure of the sensor for measuring vehicle speed, the processor replaces the output signal of the failed sensor with a constant value replacement signal.

13. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body, the plurality of sensors comprising sensors for measuring the acceleration of the wheel and hub assemblies, wherein:

the processor has failure detection means for detecting failure of each sensor for measuring acceleration of the wheel and hub assemblies, and on detection of said failure replaces the output signal of the failed sensor with a replacement signal and operates in response to the replacement signal and at least one output signal generated by at least one remaining functioning sensor of the plurality of sensors and when the detecting means detects said failure the processor replaces the output signal of the failed sensor with a zero value replacement signal.

14. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body, wherein:

the processor has failure detection means for detecting failure of a sensor of said plurality of sensors and on detection of said failure replaces the output signal of the failed sensor with a replacement signal and operates in response to the replacement signal and at least one output signal generated by at least one remaining functioning sensor of the plurality of sensors; and the failure detection means of the processor monitors the noise portion of a first output signal of a first sensor of said plurality of sensors and compares the noise portion of the first output signal with the noise portions of the output signals of other sensors of said plurality of sensors and recognizes that the first sensor has failed if the noise portion of the first output signal of the first sensor is outside a predetermined range of the noise portions of the output signals of the other sensors.

15. A land vehicle suspension system in which a plurality of wheel and hub assemblies are each connected to a body of the vehicle by one of a plurality of actuators and the operation of each actuator is controlled by a processor in response to signals received from a plurality of sensors which generate output signals indicative of the attitude of the vehicle body and the forces on the body wherein:

the processor has failure detection means for detecting failure of a sensor of the plurality of sensors and on detection of said failure replaces the output signal of the failed sensor with a replacement signal and operates in response to the replacement signal and at least one output signal generated by at least one remaining functioning sensor of the plurality of sensors; and the processor is a digital processor and the failure detection means compares at clocked intervals the output signal of a sensor with a previous output signal of the sensor and calculates the frequency with which the difference between successive outputs exceeds a preprogrammed value stored in the memory of the processor, the processor recognizing that the sensor has failed if the frequency exceeds a calculated predefined frequency stored in the memory.

* * * * *